J. H. HILLS & J. M. MASON.
THEFT DETECTOR FOR AUTOMOBILES AND OTHER VEHICLES.
APPLICATION FILED JAN. 9, 1917.
1,252,110.
Patented Jan. 1, 1918.
3 SHEETS—SHEET 2.
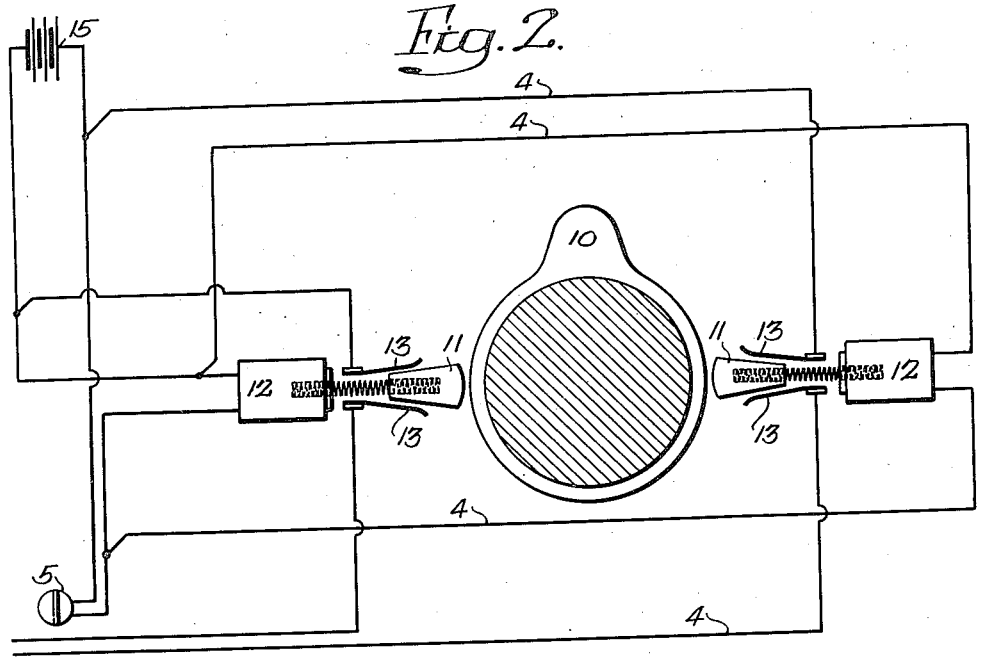
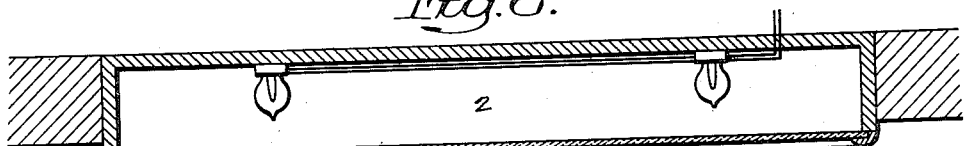
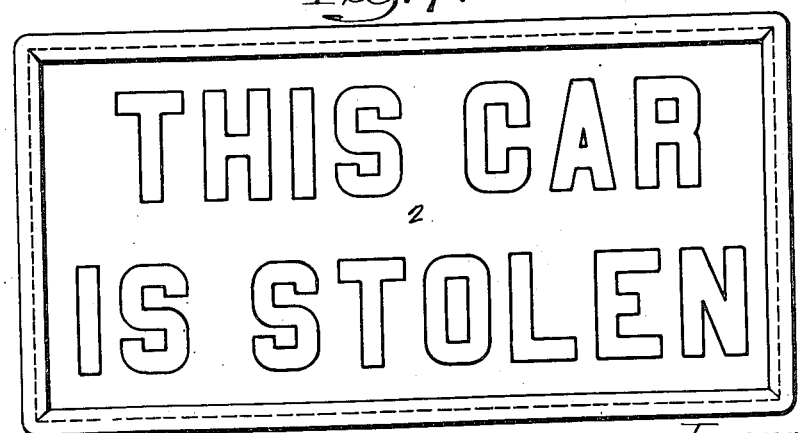

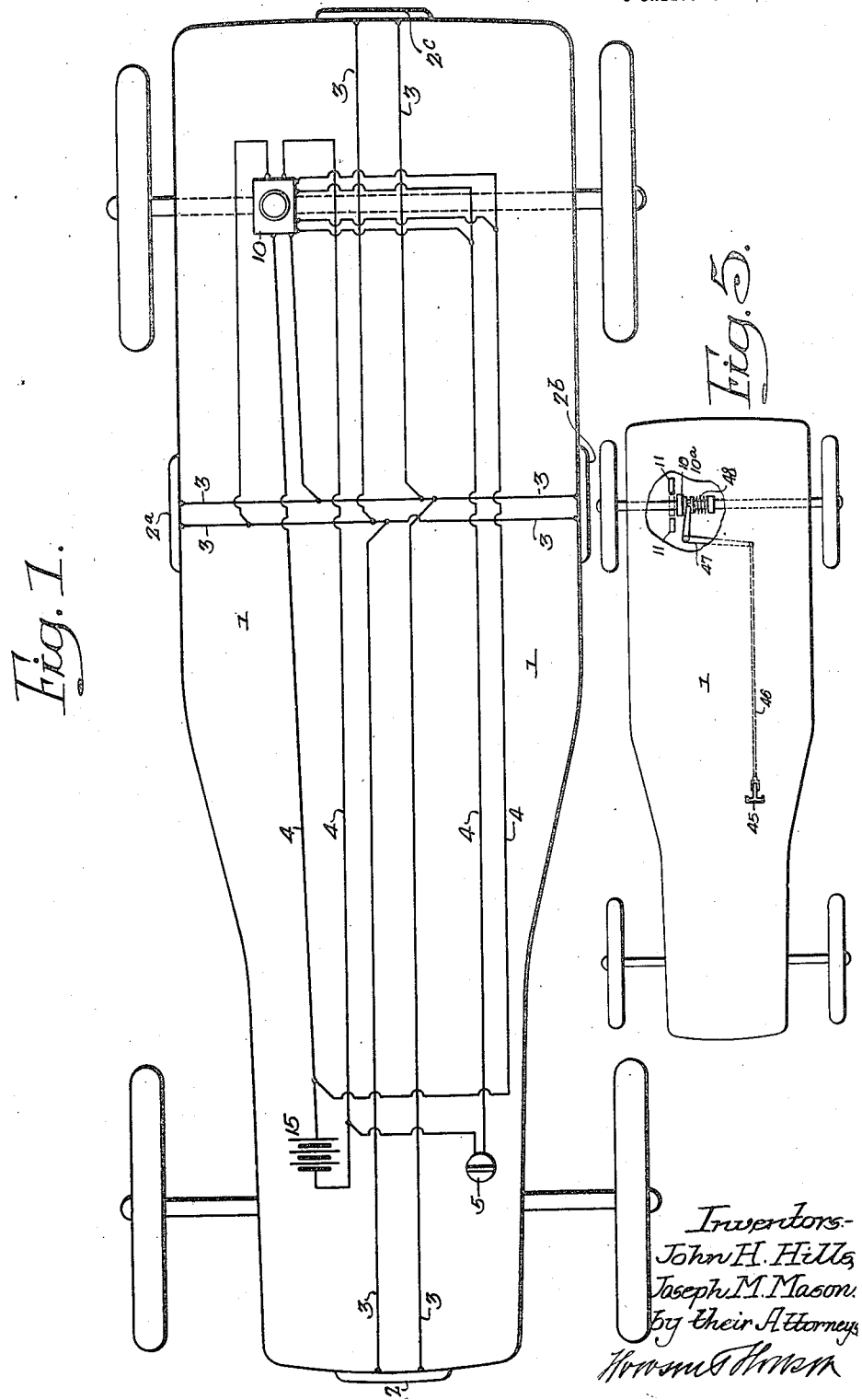

J. H. HILLS & J. M. MASON.
THEFT DETECTOR FOR AUTOMOBILES AND OTHER VEHICLES.
APPLICATION FILED JAN. 9, 1917.

1,252,110.

Patented Jan. 1, 1918.
3 SHEETS—SHEET 3.

Inventors.—
John H. Hills,
Joseph M. Mason.
by their Attorneys.

UNITED STATES PATENT OFFICE.

JOHN H. HILLS AND JOSEPH M. MASON, OF PHILADELPHIA, PENNSYLVANIA.

THEFT-DETECTOR FOR AUTOMOBILES AND OTHER VEHICLES.

1,252,110.  Specification of Letters Patent.  Patented Jan. 1, 1918.

Application filed January 9, 1917. Serial No. 141,385.

*To all whom it may concern:*

Be it known that we, JOHN H. HILLS and JOSEPH M. MASON, citizens of the United States, and residents of Philadelphia, Pennsylvania, have invented certain Improvements in Theft-Detectors for Automobiles and other Vehicles, of which the following is a specification.

The object of our invention is to provide means in the form of one or more indicators which will be visible or audible when a vehicle, such as an automobile, is being used by an unauthorized person, and to actuate such visible or audible indicator or indicators by electrical means.

In carrying out our invention, we prefer to provide such car with a plurality of visible or audible signals or indicators which may be placed at various points on the car; for instance if visible signals are employed, they may be placed to show from the rear of the car, the front of the radiator, and from both sides of the car at convenient positions. If desired, other lights may be mounted on the wheels. These visible signals or indicators are designed to be illuminated by suitable lighting means, preferably electric, and are electrically controlled by means automatically brought into operation when any unauthorized attempt is made to run the car, or to tow the same away, after a switch has been set by the owner upon leaving the car.

The co-acting means preferably employed to bring about such action will be carried by some moving part of the car other than the engine or, in other words, some part which must move with the running gear should an attempt be made to tow the car away.

These and other features of our invention are more fully described hereinafter, reference being had to the accompanying drawings, in which:

Figure 1, is a diagrammatic plan view of an automobile, showing the position of the signals and the wiring system.

Fig. 2, is a sectional view of the driving shaft, showing automatically operated switches for controlling the lighting circuit after the owner's switch is set.

Fig. 5, is a diagrammatic plan view illustrating a detail of our invention.

Fig. 6, is a sectional plan view of one form of signal structure which may be employed, and Fig. 7, is a front elevation of the same.

Figure 3:
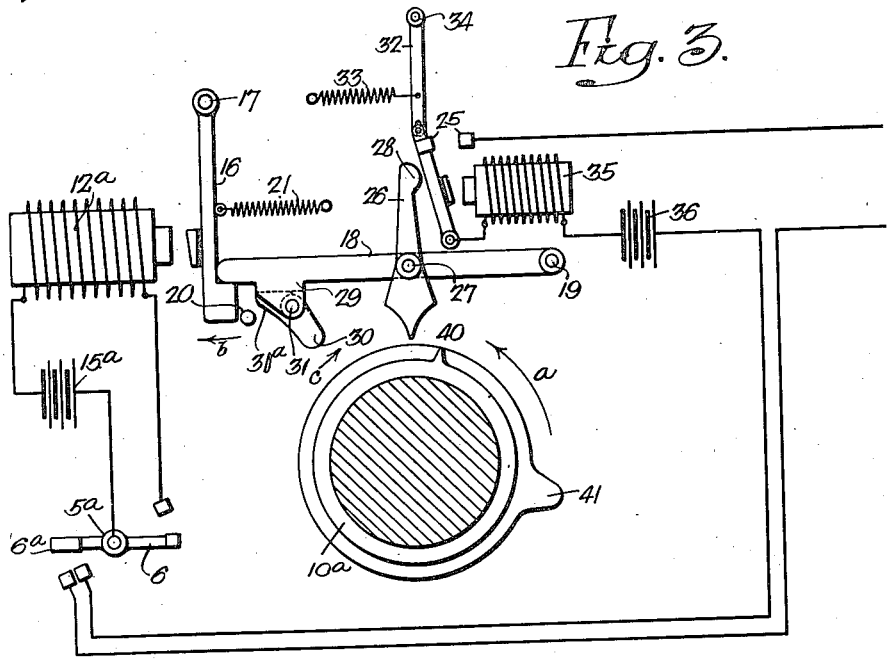
Figs. 3 and 4, are views illustrating modified controlling mechanism within the scope of our invention.

In the drawings, 1 indicates a car body which may have a plurality of visible signals or indicators 2, $2^a$, $2^b$ and $2^c$, all of which may be illuminated by lamps connected to one lighting circuit indicated by the wires 3, 3, 3, 3, etc., or audible signals may be similarly connected to a single circuit. These lights may be controlled by automatically operated switches, more fully described hereinafter, and these switches are under the control of an electric circuit indicated at 4, 4, 4, 4, etc., which is controlled by an owner's switch 5.

On the rear axle, or at some other portion of the running gear or operating mechanism of the car which must move under any and all conditions while the car is in motion, is a cam 10 which rotates with such part. In the path of this cam, in one arrangement of our improved mechanism, we mount a plurality of contact buttons or plugs 11 which are disposed in such position with reference to magnets 12, that when said magnets are energized, said plugs will be held in position to close the lighting circuit; contact fingers 13 of the latter being disposed for engagement by said plugs 11 when the latter are moved by the cam 10. It will be readily seen therefore that if the owner's switch 5 is turned to energize the circuit in which the magnets 12 are connected, movement of that part of the automobile carrying the cam 10 will cause the latter to engage and move the contact plugs 11 into circuit-closing position for the lighting circuit; thereby illuminating the lamps of the several signals 2, $2^a$, $2^b$ and $2^c$, should any unauthorized attempt be made to drive the car or tow the same away.

A battery 15 may be employed to energize the magnets 12, and it may be a special battery, or any battery employed upon the car for any purpose in connection with the operation of the same, or these magnets may be connected to any other source of electrical energy carried by the car.

Figure 4:
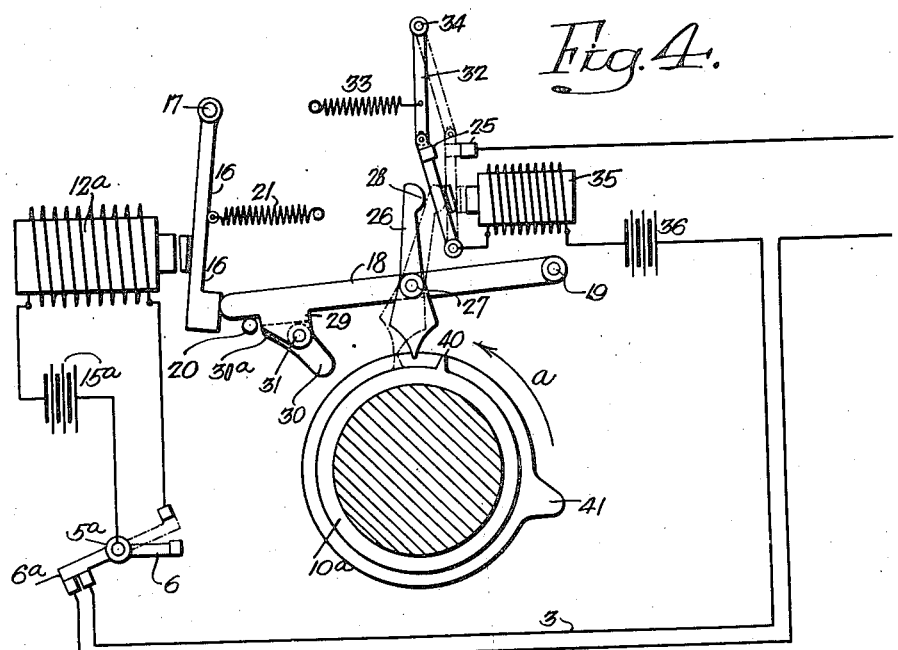

Another arrangement of mechanism for effecting the operation of the signals or indicators is shown in Figs. 3 and 4. In these views, $10^a$ may represent a cam mounted upon any rotating part of the automobile (excepting preferably the engine or any connecting part of same), revolving in the direction of the arrow *a*. This mechanism is controlled by owner's switch 5ª, which may be duplex in character; one part 6 controlling a circuit through magnet 12ª, and the other part 6ª controlling a lighting circuit or a circuit having audible signals.

Fig. 3 shows the mechanism in the position it assumes when the automobile is being operated by the owner; owner's switch 5ª being in the "off" position. When the owner leaves the automobile, and wishes to throw into action theft detecting mechanism, he closes switch 5ª, thus throwing the mechanism into position shown by the full lines in Fig. 4.

The part 6 of the owner's switch 5ª is double, that is to say, when it is thrown to the "on" position, it is actuated in two steps, "on" for an instant and then "off" again. During the instant it is "on," the magnet 12ª attracts pendulum 16, causing its lower end to move to the left (as indicated by arrow *b* in Fig. 3) on its pivot point 17, thereby releasing lever 18 and causing it to move on its fulcrum 19 and drop to the position shown in Fig. 4; being prevented from dropping too far by a stop 20. This lever is shown as dropping by gravity, but if desired this movement can be effected positively by the use of a suitable spring, (not shown). The pendulum 16 may be normally held in the position shown in Fig. 3, by a tension spring 21.

At the next instant, when the part 6 of the switch is "off," the electric circuit is broken through magnet 12ª, thereby eliminating continuous drain on battery 15ª. The pendulum 16, however, is held to the left, as shown in Fig. 4, by engagement with the end of the lever 18, which has previously dropped. The circuit in which the signal lights are connected is controlled by two switches; part 6ª of owner's switch, and switch 25, which operates automatically by an illegal movement of the automobile upon rotation of the part 10ª, as described below.

The lever 18 carries an auxiliary lever 26, retained in a vertical position by being suitably weighted at its lower end, but free to move about its pivot point 27 on lever 18. The lower end of lever 26 is pointed or knife-edged, while its upper end has a lug 28. The lever 18 also carries a lug 29, to which a lever 30 is pivoted at 31; said lever being free to swing on its pivot point to the right only, as shown by arrow *c*, and prevented from swinging to the left, by reason of its shoulder 30ª engaging the lug 29.

The lighting circuit includes, in addition to switches 6ª and 25 as noted above, a lever 32, which may be jointed, (held in position shown by Fig. 3 by a tension spring 33 but free to move on its pivot point 34); a magnet 35, and a battery 36. If desired, the battery 15ª may take the place of battery 36, or an additional battery may be used, or any other source of electrical energy carried by the car.

The rotating part 10ª includes a cam (or pin) 40, which only engages lever 26, and a cam 41 which only engages lever 30. These two cams are out of alinement with each other on the circumference of the part 10ª, so that each will engage only the lever for which it is intended.

When the owner is operating the automobile, the mechanism occupies the position shown in Fig. 3; there being no current in either circuit, and the rotating part 10ª with its cams 40 and 41 revolving free from contact with levers 26 and 30. When the owner leaves the automobile, however, and throws switch 5ª to the "on" position, the electric current passes for an instant through magnet 12ª, as described above, there being no current, however, through the signal light circuit. Throwing switch 5ª on, also permits lever 18 to drop to position as shown in Fig. 4 (as described above) the positions of other parts remaining unchanged.

Referring to Fig. 4, the cams 40 and 41 may be assumed to have taken positions as shown, at the instant the automobile came to a stop; that is to say, any position. If now the automobile is moved so that rotating part 10ª turns in the direction of the arrow, cam 40 strikes the lower end of lever 26, causing it to turn on its pivot point 27 and bringing the upper end 28 into engagement with the lever 32. This forces the contact points of switch 25 together, closing and completing the lighting circuit for the signals which are illuminated or a circuit for audible signals, and indicating that the automobile is stolen.

Magnet 35 being in this circuit, then holds lever 32, thus holding switch 25 in circuit after lever 26 releases it; such lever being in turn released from cam 40 as the part 10ª rotates. The magnet 45 is of sufficient strength to overcome the tension of spring 33. As the part 10ª continues to revolve, cam 41 comes in contact with lever 30, which raises lever 18 on its fulcrum 19, allowing pendulum 16, through means of tension spring 21 to return to its position as shown in Fig. 3, and support lever 18, after further movement of cam 41 releases lever 30. The mechanism has thus returned to position as shown in Fig. 3, except that switch 25 is closed and the signals are illuminated; the cams 40 and 41 revolving freely with the part 10ª.

The signal lights can only be extinguished when the owner throws "off" part 6ª of switch 5ª, (part 6 being already "off") thus breaking the circuit. This also throws magnet 35 out of circuit, allowing lever 32 to return to its original position by means of spring 33. Owner's switch can be controlled by a key lock, or any other suitable device.

If it should happen that the automobile stops when owner leaves it so as to bring cam 41 directly under lever 30 (instead of stopping so as to bring cam 41 in any other position as shown in Fig. 4) the action of the mechanism will not be interfered with. When the owner throws "on" switch 5ª, lever 18 will fall as before, except that lever 30 will turn on its pivot point and rest on cam 41, instead of falling to position as shown in Fig. 4. When the part 10ª revolves, however, cam 41 will release lever 30, allowing it to assume position shown in Fig. 4, and the action will then take place as hereinbefore described.

If it should so happen that the automobile stops so as to bring cam 40 directly under lever 26, such lever will slip off the cam, either one side or the other, because of the fact that both cam 40 and the lower end of lever 26 are pointed or knife-edged.

If it should so happen that the automobile be moved backward for a short distance (revolving part 10ª contrary to the direction of the arrow $a$) the switch 25 would not be closed, and the mechanism would not be injured. In such event, the cam 40 would strike lever 26 from the opposite side as before described, causing the upper end 28 to move away from switch 25, instead of closing it. During such action cam 41 would strike lever 30 from the opposite side as before described, but as this lever is free to turn in this direction on its pivot point, the cam 41 would have no action on the mechanism. Then as soon as the automobile stopped, and made further movement in the opposite direction so that part 10ª would rotate in the direction of the arrow $a$, the action of the mechanism would take place as hereinbefore described.

To provide against the rather unlikely occurrence of the automobile being caused to move in a reverse direction for a considerable distance, the mechanism may be duplicated at a diametrically opposite point on the machine with reference to the moving part.

The cams 10 and 10ª carried by the moving part may be arranged so as to be displaceable with reference to the various contact points, levers, &c., when the car is to be run by the owner, and for this purpose means may be provided to slide the same on its carrier; operable from the driver's seat. For this purpose, we may provide a suitable lever 45, foot-or-hand-controlled, connected by suitable means such as a link 46 and bell-crank lever 47 with the cam 10 or 10ª, which may be mounted on or operatively connected with some moving part of the vehicle. If desired, a spring as 48 may be employed to restore the cam 10 or 10ª to its active position for operation of the signal mechanism upon release of the lever 45.

We claim:

1. The combination with an automobile or other vehicle having a part that is always in motion when the vehicle is in motion, of a lighting circuit carried by the vehicle, a plurality of lamps set at intervals in said circuit, signals illuminated by said lamps, a switch for rendering said circuit active, and a movable member adapted to be actuated by the moving part of the vehicle to finally close the circuit and illuminate the lamps of the respective signals.

2. The combination with an automobile or other vehicle having a part that is always in motion when the vehicle is in motion, a signal circuit carried by the vehicle, a plurality of signals set at definite positions in said circuit, a switch for rendering said circuit active, and a movable member adapted to be actuated by the moving part of the vehicle to finally close the circuit and illuminate the lamps of the respective signals.

3. The combination with an automobile or other vehicle having a part that is always in motion when the vehicle is in motion, a lighting circuit carried by the vehicle, a plurality of signals in said circuit, a switch for rendering said circuit active, movable means adapted to be actuated by the moving portion of the vehicle to finally close the circuit and render active the respective signals, magnetic means for holding said movable means in circuit-closing position, and springs for retracting the same when the magnetic means are deënergized.

4. The combination with an automobile or other vehicle having a part that is always in motion when the vehicle is in motion, a lighting circuit carried by the vehicle, a plurality of lamps set at definite positions in said circuit, a switch for rendering said circuit active, a movable member adapted to be actuated by the moving portion of the vehicle to finally close the circuit to illuminate the lamps of the respective signals, magnetic means for holding said member in circuit-closing position, and springs for retracting the same when the magnetic means are deënergized.

5. The combination with an automobile or other vehicle having a part that is always in motion when the vehicle is in motion as a whole, a lighting circuit, a switch for rendering said circuit active, a plurality of pairs of contacts in said circuit normally open, movable plugs for engagement with said contacts, means carried by the moving part of the vehicle for mechanically moving said plugs into engagement with said contacts, magnets for holding said plugs in the engaging position after they have been positively moved to such position, and means for automatically releasing said plugs upon the deënergization of the magnets.

6. The combination with an automobile or other vehicle having a part that is always in motion when the vehicle as a whole is in motion, a signal circuit normally open, a switch for closing said circuit at one point, movable means for closing the circuit at another point, said means being actuated by the moving part of the vehicle, means for holding said last named circuit-closing-movable-means in circuit-closing position when the circuit-closing switch is closed, said moving part of the vehicle being movable to an inactive position, means for moving said means to the inactive position, and means for restoring the same to active position.

7. The combination with an automobile or other vehicle having a part that is always in motion when the vehicle as a whole is in motion, a lighting circuit normally open, a switch for closing said circuit at one point, movable means for closing the circuit at another point, said means being actuated by the moving part of the vehicle, means for holding said movable means in circuit-closing position when the switch is closed, said moving part of the vehicle being movable to an inactive position, means for moving said part to the inactive position, and means for restoring the same to active position.

8. The combination with an automobile or other vehicle having a part that is always in motion when the vehicle as a whole is in motion, a signal lighting circuit normally open, a switch for closing said circuit at one point, movable means for closing the circuit at another point, a cam actuated by the moving part of the vehicle for operating said movable means, means for holding said movable means in circuit-closing position when the first named switch is closed, said actuating cam being movable to an inactive position, means for moving said cam to the inactive position, and means for restoring the cam to its active position.

9. The combination with a vehicle having a moving part that is always in motion when the vehicle is in motion, of a signal circuit carried by said vehicle and normally open, a switch for rendering said circuit active, movable means adapted to be actuated by the moving part of the vehicle to finally close the circuit and energize the signals, and means for holding said movable means in circuit-closing position.

10. The combination with a vehicle having a moving part that is always in motion when the vehicle is in motion, of a lighting signal circuit carried by said vehicle and normally open, a switch for rendering said circuit active, movable means adapted to be actuated by the moving part of the vehicle to finally close the lighting circuit and energize the signals, and means for holding said movable means in circuit-closing position.

11. The combination with an automobile or other vehicle having a part that is always in motion when the vehicle is in motion, of a signal circuit, signals set at intervals in said circuit, a switch for closing said circuit at one point, a movable member for closing the circuit at another point; said movable member being actuated by the moving part of the vehicle, and means controlled by the switch for holding said movable member in circuit-closing position.

12. The combination with an automobile or other vehicle having a part that is always in motion when the vehicle is in motion, of a lighting signal circuit, signal lamps set at intervals in said circuit, a switch for closing said circuit at one point, and a movable member for closing the circuit at another point, said movable member being actuated by the moving part of the vehicle, and means controlled by the switch for holding said movable member in circuit-closing position.

In witness whereof we affix our signatures.

JOHN H. HILLS.
JOS. M. MASON.